United States Patent
Bottazzi

[19]

[11] Patent Number: 5,917,176
[45] Date of Patent: Jun. 29, 1999

[54] OPTICAL CODE HAND-READER

[75] Inventor: Davide Bottazzi, Bologna, Italy

[73] Assignee: Datalogic S.p.A., Lippo di Calderara di Reno, Italy

[21] Appl. No.: 08/929,117

[22] Filed: Sep. 15, 1997

[30] Foreign Application Priority Data

Sep. 17, 1996 [EP] European Pat. Off. ............. 96830473

[51] Int. Cl.[6] .................................................. G06K 7/10
[52] U.S. Cl. ............................... 235/472.01; 235/462.49; 235/462.45; 235/462.37; 359/223; 359/224; 359/198
[58] Field of Search ..................... 235/462.49, 462.37, 235/462.45, 472.01, 472.03; 359/223, 224, 198

[56] References Cited

U.S. PATENT DOCUMENTS

| | | | |
|---|---|---|---|
| 4,732,440 | 3/1988 | Gadhok | 350/6.6 |
| 5,288,984 | 2/1994 | Ito et al. | 235/472 |
| 5,412,198 | 5/1995 | Dvorkis | 235/472 |

FOREIGN PATENT DOCUMENTS

| | | |
|---|---|---|
| 0488202A1 | 6/1992 | European Pat. Off. . |
| 0590537A2 | 4/1994 | European Pat. Off. . |
| 0590537A3 | 4/1994 | European Pat. Off. . |
| 67692 | 9/1986 | Japan ...................................... 235/462 |

OTHER PUBLICATIONS

Patent Abstracts Of Japan vol. 015, No. 088 (P–1174), Mar. 4, 1991 & JP 02 304685 A (Matsushita Electric Ind Co Ltd), Dec. 18, 1990, "abstract".

*Primary Examiner*—Donald Hajec
*Assistant Examiner*—Daniel Felten
*Attorney, Agent, or Firm*—Nixon & Vanderhye, P.C.

[57] ABSTRACT

A hand-held reader of an optical code comprises a shell containing a mirror capable of deflecting a beam of light diffused by the optical code of a label or of a product. The mirror is mounted elastically in the shell by means of a spring element formed by a central plate capable of supporting the mirror, provided with two protruding fins. Each of the fins comprises a first portion inclined with respect to the central plate and a second portion folded over with respect to the first portion and provided with a slot capable of engaging in a disconnectable manner a projection of a supporting element integral with the shell.

13 Claims, 3 Drawing Sheets

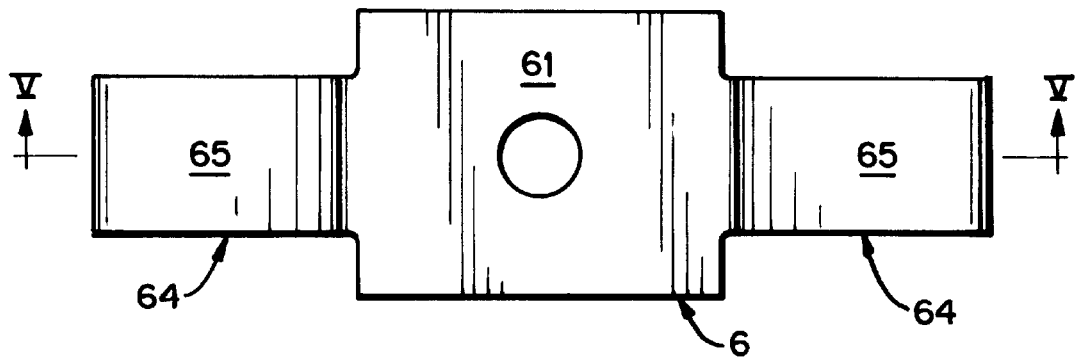
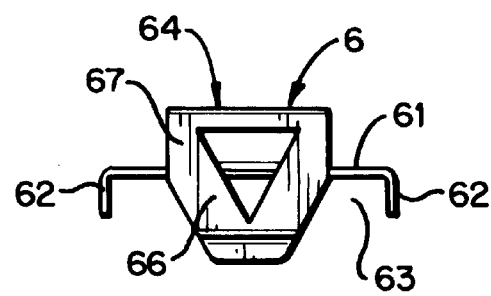
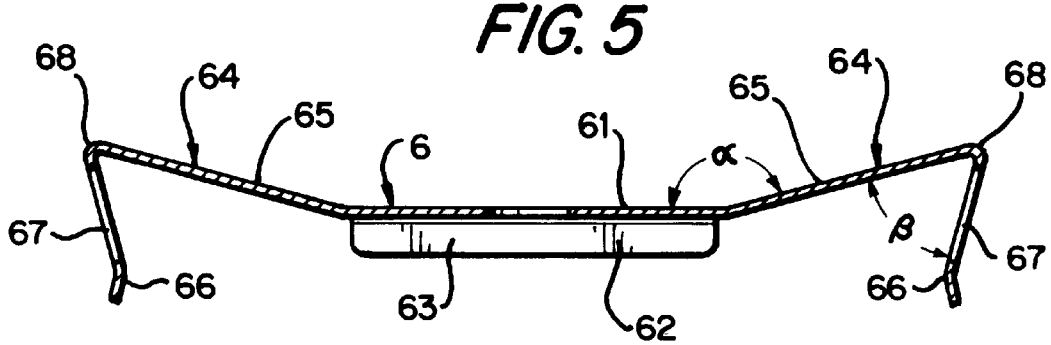

OPTICAL CODE HAND-READER

This application is based on the European Patent Application No. 96830473.3, the content of which is incorporated hereinto by reference.

BACKGROUND AND SUMMARY OF THE INVENTION

The present invention relates to a hand-held reader of an optical code.

With the term optical code it is intended to indicate a set of graphic signs (placed either on a label or directly on a product or on any other support) by means of which a piece of information is coded as a sequence of white areas and black areas or areas of various colours, arranged along one or more directions. Examples of such codes are bar codes, two-dimensional codes, colour codes and others.

The reading of optical codes can take place by means of fixed or hand-held readers (reading devices). The latter are provided with a reading casing (or shell) with a window (or mouth) through which there are active both means that illuminate the code to be read, and means that read the image of the illuminated code detecting the light diffused by it and transforming it into electrical signals.

A reader of this type, generally, is provided with a shell with an angled shape that allows it to be handled in an ergonomic manner and that has, along the optical path, a mirror capable of directing the light diffused by the code on a photoelectric transducer. The photo-electric transducer emits an electrical signal that is sent to a data processing circuit capable of decoding the information contained in the optical code.

In the known readers, the mirror is mounted in a special seat of the shell and fastened by means of screws. Between the seat and the mirror there is interposed a rubber gasket that has the object of avoiding misalignments and breakages when the reader falls down. A drawback, this, that occurs with great frequency as the readers are hand-held.

Thus, the fastening of the mirror in its seat by means of screws and gasket involves the use of a fair number of components and this makes the operations of assembling the readers somewhat laborious. This involves increases in the readers' manufacturing costs.

The object of the present invention is to simplify the assembling of a hand-held reader of an optical code and to make the constraint of the mirror in the shell more secure.

The abovementioned object, according to the invention, is attained with a hand-held reader of an optical code comprising a shell wherein there is mounted a mirror capable of deflecting light diffused by said optical code, characterized in that it comprises a spring element capable of elastically supporting said mirror in said shell, said spring element being formed by a central plate capable of housing said mirror and provided with two fins protruding laterally, each of said fins comprising a first portion inclined with respect to said central plate by a first preselected angle so that it remains raised with respect to said mirror and a second portion folded over with respect to said first portion by a second preselected angle, said second portion being provided with connecting means capable of engaging in a disconnectable manner a supporting element integral with said shell.

In the reader of an optical code according to the invention, the mirror is mounted elastically in the shell by means of the spring element and, when the reader falls down, it can move freely with respect to the shell, but without leaving its seat. Thus, it does not break and it automatically returns to the correct position, avoiding misalignments in the optical path of the beam of diffused light.

Thus, just one component formed by the spring element performs several functions: it acts as a fastening and positioning means of the mirror in the shell and it serves as a shock absorber when the reader falls down.

Since the elastic mount of the mirror in the shell is executed by means of a single component, the assembling of the reader is considerably simplified, with a significant drop in manufacturing costs.

Features and advantages of the invention will now be illustrated with reference to an embodiment represented as a non-limitative example in the enclosed drawings, wherein:

BRIEF DESCRIPTION OF THE DRAWINGS

FIG. 3 is a plan view from above of a spring element of the reader of FIGS. 1 and 2;

FIG. 4 is a side view of the spring element of FIG. 3;

FIG. 5 is a cross-sectional view taken along the line V—V of FIG. 3.

DETAILED DESCRIPTION OF INVENTION

Figure 1:
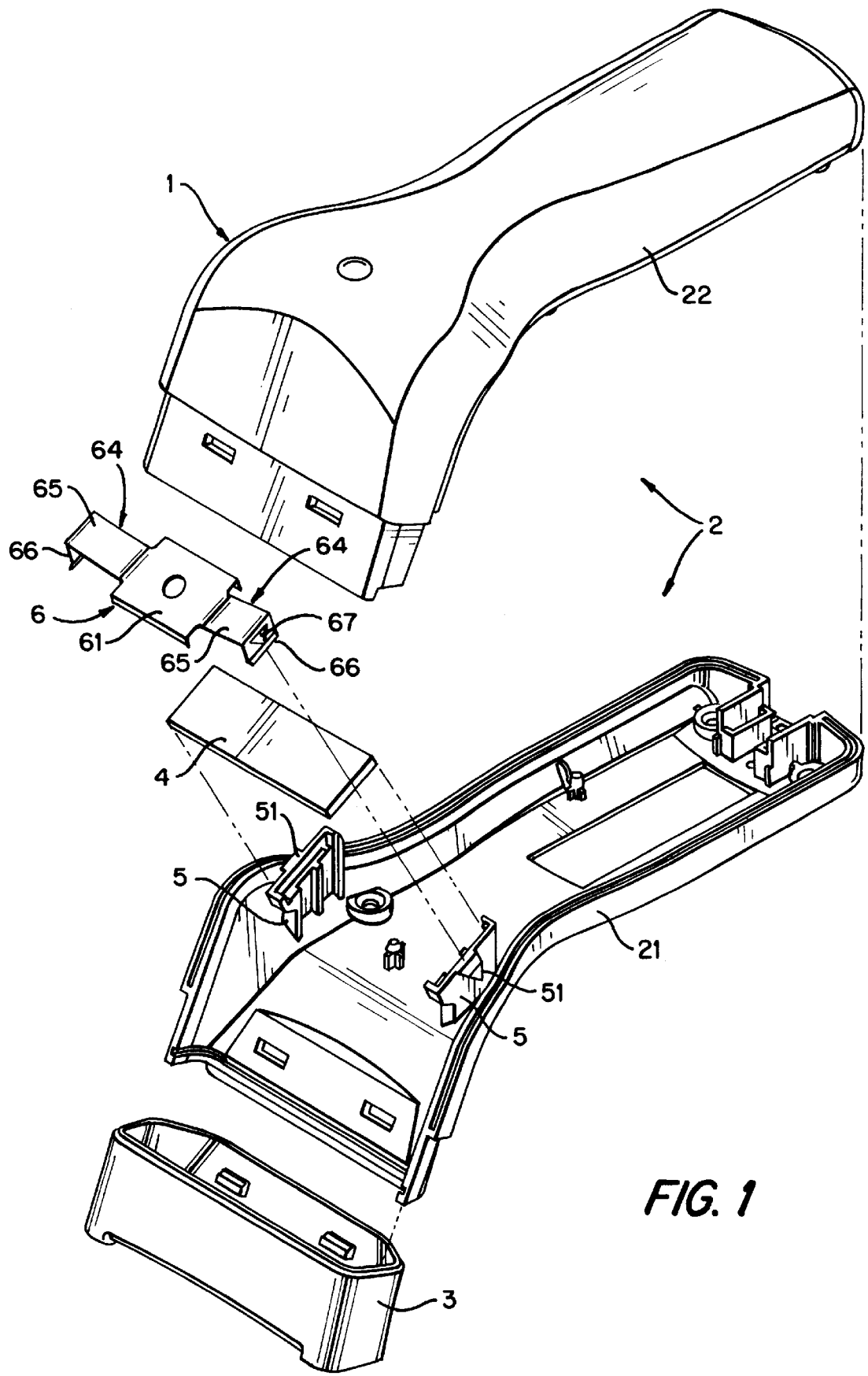
FIG. 1 is a diagrammatic, exploded, view of a hand-held reader of an optical code, made according to the present invention.
Figure 2:
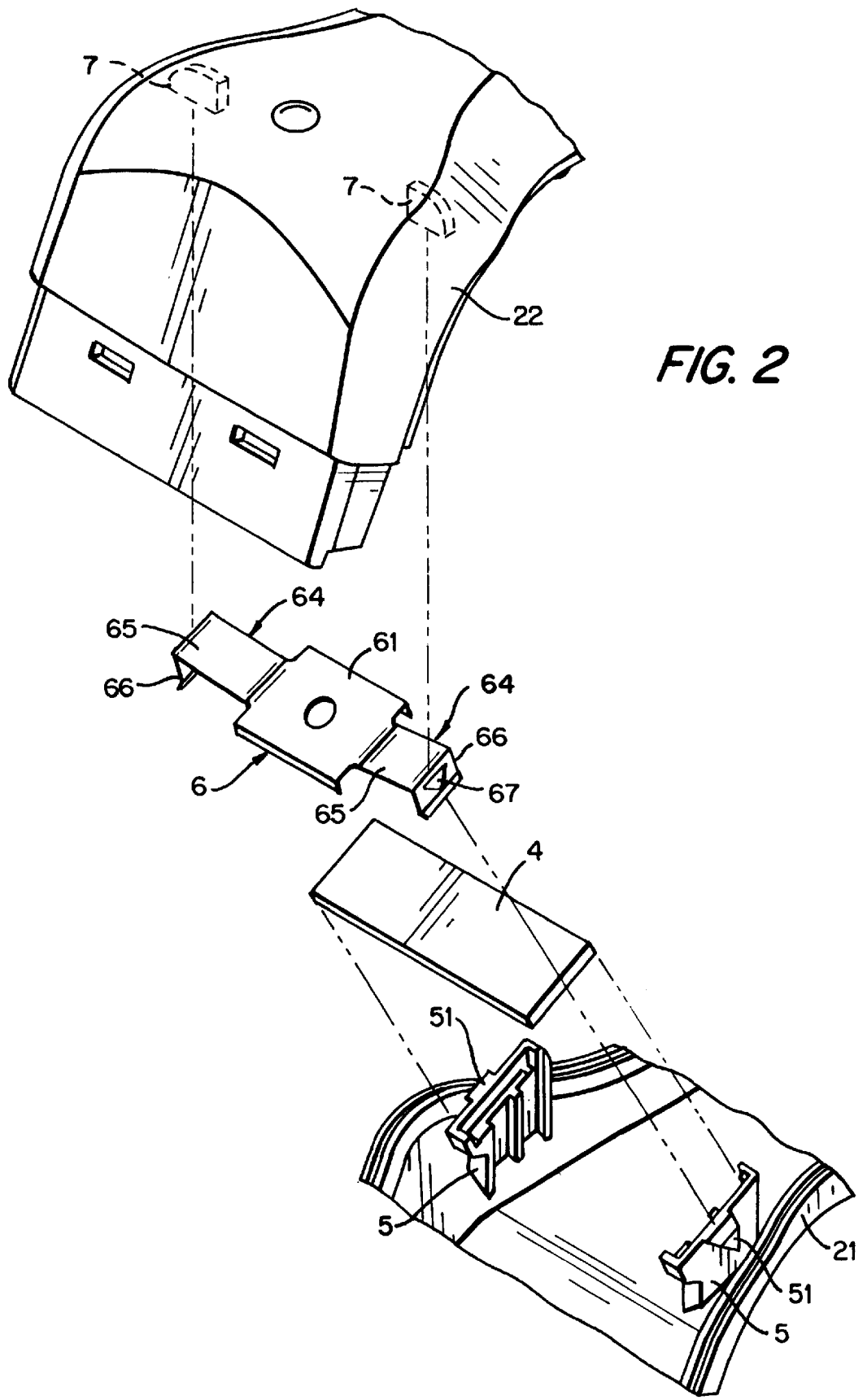
FIG. 2 is a partial, perspective, view, in an enlarged scale, of the reader of FIG. 1.

In FIGS. 1 and 2 there is shown a hand-held reader of an optical code, indicated as a whole with 1, comprising an angled shell 2 formed by a lower casing 21 and by an upper cover 22. The shell 2 is provided with a mouth 3 containing a conventional focusing lens, not shown. The focusing lens serves to concentrate a beam of light emitted by photodiodes, not shown, on an optical code present on a label or on a product, both also not shown, and to direct a beam of light diffused by the label or by the product on a mirror 4. The mirror 4, in turn, directs the beam of light to a conventional opto-electric transducer, not shown, operationally connected to a data processing circuit, also not shown, that decodes the information contained in the optical code.

The mirror 4 is mounted elastically in two walls 5 supporting the lower casing 21 by means of a spring element 6.

As also shown in FIGS. 3–5, the (elastic) spring element 6 is formed by a central plate 61 provided with two folded-over portions 62 that form a seat 63 capable of housing the mirror 4. The central plate 61 is also provided with two fins 64 protruding laterally, having a substantially "L"-shaped transversal cross-section. Each of the fins 64 comprises two portions, 65 and 66, respectively. The portion 65 is inclined with respect to the plate 61 by an angle $\alpha$ less than 180°, preferably an angle ranging from 175° to 150°, so that it remains raised with respect to the mirror 4, and terminates with an upper part 68. The portion 66 is folded over with respect to the portion 65 by an angle $\beta$ less than 90°, preferably ranging from 75° to 50°. The portions 66 are provided with respective slots 67 capable of engaging in a self-centering and detachable manner projections 51 with which the walls 5 are provided. The slots 67 and the projections 51 have a triangular shape, but they can have a different shape, for instance like a trapeze, a semicylinder and such like, as long as they are self-centering.

After the mirror 4 has been mounted in the seat 63 of the central plate 61, the spring element 6 is snap-fastened to the walls 5 by connecting the slots 67 to the projections 51.

The cover 22 is provided with two protruding tangs 7 that act as limit stop for the fins 64 when the reader 1 falls down. The tangs 7 are arranged opposite the upper part 68 of the portions 65 (FIG. 2) and have dimension such that, under the reader's normal operating conditions, there is no contact between them and the upper part 68 of the portions 65. The distance between the tangs 7 and the upper part 68 of the portions 65 is such that, when the reader falls down or bumps, the spring element 6, being elastic, can move until the upper part 68 of the portions 65 comes into contact with the tangs 7. In this manner, the spring element 6 and the mirror 4, while falling down or is subjected to a bump, can move elastically and avoid the breakage of the mirror itself. But movements are limited avoiding the possibility that the slots 67 of the spring element 6 can become detached from the projections 51 of the supporting walls 5. The triangular shape of the slots 67 and of the projections 51, moreover, cause the spring element 6 to reposition itself exactly in the correct position, after fall or bump.

What is claimed is:

1. A hand-held reader of an optical code comprising a shell wherein there is mounted a mirror capable of deflecting light diffused by said optical code, characterized in that it comprises a spring element capable of elastically supporting said mirror in said shell, said spring element being formed by a central plate capable of housing said mirror and provided with two fins protruding laterally, each of said fins comprising a first portion inclined with respect to said central plate by a first preselected angle so that it remains raised with respect to said mirror and a second portion folded over with respect to said first portion by a second preselected angle, said second portion being provided with connecting means capable of engaging in a disconnectable manner a supporting element integral with said shell.

2. A hand-held reader according to claim 1, characterized in that said first portion is inclined by an angle $\alpha$ less than 180° with respect to said central plate.

3. A hand-held reader according to claim 2, characterized in that said angle $\alpha$ ranges from 175° to 150°.

4. A hand-held reader according to claim 1, characterized in that said second portion is inclined by an angle $\beta$ less than 90° with respect to said first portion.

5. A hand-held reader according to claim 4, characterized in that said angle $\beta$ ranges from 75° to 50°.

6. A hand-held reader according to claim 1, characterized in that said second portion of said fins is provided with a slot capable of engaging a projection of said supporting element.

7. A hand-held reader according to claim 1, characterized in that said fins engage in a self-centering manner respective supporting elements by means of a respective slot and a respective projection.

8. A hand-held reader according to claim 7, characterized in that said slot snap-engages said projection.

9. A hand-held reader according to claim 7, characterized in that said slot and projection have a triangular shape.

10. A hand-held reader according to claim 1, characterized in that said fins have a substantially "L"-shaped transversal cross-section.

11. A hand-held reader according to claim 1, characterized in that said central plate has two folded-over portions that form a seat capable of housing said mirror.

12. A hand-held reader according to claim 1, characterized in that said shell is provided with two protrusions capable of acting as limit stop for said fins when said reader falls down or bumps so as to avoid the disconnection of said spring element from said supporting elements.

13. A hand-held reader according to claim 12, characterized in that said protrusions have dimensions such that they are normally spaced from said fins and come into contact with them when said reader falls down or bumps.

* * * * *